(12) United States Patent
Windisch et al.

(10) Patent No.: US 6,706,830 B2
(45) Date of Patent: Mar. 16, 2004

(54) COPOLYMERIZATION OF CONJUGATED DIENES WITH NON-CONJUGATED OLEFINS BY MEANS OF RARE EARTH CATALYSTS

(75) Inventors: Heike Windisch, Leverkusen (DE); Gerd Sylvester, Leverkusen (DE); Rudolf Taube, Halle (DE); Steffen Maiwald, Trebsen/Itenhain (DE); Jürgen Giesemann, Halle (DE); Thomas Rosenstock, Merseburg (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/275,501

(22) PCT Filed: Apr. 26, 2001

(86) PCT No.: PCT/EP01/04695

§ 371 (c)(1),
(2), (4) Date: Apr. 21, 2003

(87) PCT Pub. No.: WO01/85814

PCT Pub. Date: Nov. 15, 2001

(65) Prior Publication Data

US 2003/0162920 A1 Aug. 28, 2003

(30) Foreign Application Priority Data

May 9, 2000 (DE) .......................... 100 22 497

(51) Int. Cl.$^7$ .................. C08F 4/52; C08F 236/04
(52) U.S. Cl. .................. 526/170; 526/129; 526/130; 526/134; 526/164; 526/308; 526/337; 526/339; 526/340
(58) Field of Search ................ 526/164, 170, 526/308, 337, 339, 340, 129, 130, 134, 336

(56) References Cited

U.S. PATENT DOCUMENTS

| | | | |
|---|---|---|---|
| 4,540,744 A | 9/1985 | Oshima et al. | 525/332.9 |
| 4,619,982 A | 10/1986 | Jenkins | 526/164 |
| 5,096,970 A | 3/1992 | Hattori et al. | 525/368 |
| 5,731,381 A | 3/1998 | Apecetche et al. | 526/83 |
| 5,958,820 A | 9/1999 | Taube et al. | 502/102 |
| 6,284,697 B1 * | 9/2001 | Windisch et al. | 526/164 X |
| 6,441,107 B1 * | 8/2002 | Muruganandam et al. | 526/60 |

FOREIGN PATENT DOCUMENTS

| | | |
|---|---|---|
| CA | 1 143 711 | 3/1983 |
| DE | 199 26 283 | 12/2000 |
| EP | 0 277 003 | 8/1988 |
| EP | 0 277 004 | 8/1988 |
| EP | 0 573 403 | 12/1993 |

OTHER PUBLICATIONS

J. Polymer Sci. Ser. A: 39/12, (month unavailable) 1997, pp. 1259–1265, Bodrova et al, "Copolymerization of Isoprene and Styrene with a Neodymium Chloride–Based Catalytic System".
Ullmanns Enzyklopadie der technischen Chemie, vol. 21, pp. 439–475 (date unavailable) "Siliciumdioxid" (silica gels), Weiss et al.
Ullmanns Enzyklopadie der technishcen Chemie, vol. 23, pp. 311–326, (date unavailable) Ton und Toniminerale (clays) Lagaly et al.
Ullmanns Enzyklopadie der technischen Chemie, vol. 14, (date unavailable) pp. 633–651 "Kohlenstoff" (carbon blacks).
Ullmanns Enzyklopaide der technischen Chemie (English translation) Eckehard Roland, Peter Kleinschmit "Zeolites".
Polymer, vol. 37 No. 2, pp. 349–352, (month unavailable) 1996, pp. 349–352, Yingtai et al, "Copolymerization of styrene with butadiene and isoprene using a rare earth catalyst".
J. Polymer Sci. Part A: Vol 33, (month unavailable) 1988, pp. 2175–2182, Kobayashi et al, "Copolymerization of Butadiene and Styrene with a Gadolinium Tricarboxylate Catalyst".
J. Polymer Sci. Part A: vol. 36, (month unavailable) 1998, pp. 241–247, Kobayashi et al, "Homo– And Copolymerization of Butadiene and Styrene with Neodymium Tricarboxylate Catalysts".

* cited by examiner

*Primary Examiner*—Fred Teskin
(74) *Attorney, Agent, or Firm*—Joseph C. Gil; Jennifer R. Seng

(57) ABSTRACT

The present invention relates to a process for the copolymerization of conjugated diolefins with non-conjugated olefins in the presence of rare earth metal catalysts. The advantages of the process according to the invention are in particular the high selectivity, good space-time yield and the possibility of being able to vary the reaction conditions within a wide range.

12 Claims, No Drawings

COPOLYMERIZATION OF CONJUGATED DIENES WITH NON-CONJUGATED OLEFINS BY MEANS OF RARE EARTH CATALYSTS

FIELD OF THE INVENTION

The present invention relates to a process for the copolymerisation of conjugated diolefins with non-conjugated olefins in the presence of rare earth metal catalysts.

BACKGROUND OF THE INVENTION

The polymerisation of conjugated diolefins has been known for a long time and is described for example by W. Hoffmann, Rubber Technology Handbook, Hanser Publishers (Carl Hanser Verlag), Munich, Vienna, New York, 1989. Thus, for example, polybutadiene is nowadays mainly produced by solution polymerisation using Ziegler-Natta type co-ordination catalysts, for example based on titanium, cobalt, nickel and neodymium compounds, or in the presence of alkyllithium compounds. The solvent that is used in each case depends largely on the type of catalyst that is employed. Benzene or toluene as well as aliphatic or cycloaliphatic hydrocarbons are preferably used.

In contrast to the respective homopolymerisation, there are however few references to the copolymerisation of conjugated diolefins with non-conjugated olefins.

From U.S. Pat. No. 4,540,744 it is known to use anionic initiators for the polymerisation of butadiene and styrene in hexane. The disadvantage of the described process is that it is possible only to a limited extent to control the cis/trans ratio in the butadiene fraction and to obtain relatively high cis contents. However, high cis contents are advantageous for applications in the tyre and plastics modification sectors.

The disadvantage of the anionic initiators is that butadiene-styrene copolymers (SBR) are formed that permit only a slight control of the microstructure in relation to the butadiene units. It is not possible to obtain economically with anionic initiators a high cis-content SBR in which the 1,4-cis content is above 50%. Only the proportion of 1,2-units can be raised by adding modifiers, the 1,2-content leading to an increase in the glass transition temperature of the polymer. This is particularly disadvantageous on account of the fact that SBR is formed in this process, in which with increasing styrene content there is, in contrast to homopolymeric polybutadiene (BR), a further rise in the glass transition temperature. However, if the rubber is to be used for impact shock modification of for example HIPS or ABS, a high glass transition temperature of the rubber has a deleterious effect on the low temperature toughness of the material, and accordingly rubbers having low glass transition temperatures are preferred.

Furthermore, Kobayashi et al., for example in J. Polym. Sci., Part A, Polym. Chem., 33 (1995) 2175 and 36 (1998) 241 and Yingtai et al., for example in Polymere, 37/2 (1996) 349–352 have described a catalyst system consisting of halogenated acetates of the rare earth metals, such as for example $Nd(OCOCCl_3)_3$ or $Gd(OCOCF_3)_3$, with tri (isobutyl)aluminium and diethylaluminium chloride, which enables butadiene and styrene to be copolymerised in the inert solvent hexane. The disadvantage of these catalysts is that the catalyst activity falls to below 10 g polymer/mmole catalyst/hr. even at a low styrene incorporation of about 5 mole %, and that the 1,4-cis content of the polymer drops significantly with increasing styrene content.

Bodrova et al. describes for example in Polymer Sci., Ser. A 39/12 (1997) 1259–1265 a catalyst system consisting of $NdCl_3$-3 ROH and trisisobutyl aluminium, with which in the polymerisation of mixtures of isoprene and styrene in various inert solvents polymers are formed that have an overall styrene content of less than 10% as detected by H-NMR spectroscopy. The polymerisations were carried out at 60° C. over a period of 30 hours. In our own experiments however we were able to show that the polymerised styrene is mainly polystyrene that was formed during the long polymerisation time in, for example, a thermally induced secondary reaction.

In U.S. Pat. No. 5,096,970 and EP-A-304088 a process is described for the production of polybutadiene in styrene using catalysts based on neodymium phosphonates, organic aluminium compounds such as di(isobutyl)aluminium hydride (DIBAH), and based on a halogenated Lewis acid such as ethyl aluminium sesquichloride, in which the butadiene is converted in styrene to a 1,4-cis-polybutadiene without further addition of inert solvents. The disadvantage of this catalyst is that it is not possible to form styrene-butadiene copolymers in this case. A comparable catalyst system based on a rare earth metal carboxylate, an aluminium alkyl and a halogenated Lewis acid is described in EP-A 11184 as a particularly advantageous catalyst system for the production of polybutadiene with a high proportion of cis-1,4 units in aliphatic solvents.

It is furthermore known that allyl complexes of the rare earth metals in combination with co-catalysts, preferably with alumoxanes, in non-polar solvents such as toluene and n-heptane are suitable catalysts for the polymerisation of butadiene with a high content of 1,4-cis double bonds [R. Taube, H. Windisch, S. Maiwald, Makromol. Symp. 89 (1995) 393–409].

SUMMARY OF THE INVENTION

The object of the present invention was accordingly to provide a process for the copolymerisation of conjugated diolefins and non-conjugated olefins such as vinyl aromatic monomers, by means of which copolymers are obtained in which the polymer composition may be varied as regards the content of for example vinyl aromatic compounds and diolefins and with respect to the selectivity of the polymerised diolefins, i.e. for example the content of cis-positional double bonds and 1,2 units with side-chain vinyl groups.

With the catalyst systems according to the invention it is possible to adjust the cis content and thus the ratio of the cis to trans fractions independently of the styrene content. This possibility of varying the cis content is not possible with the known alkyllithium-based catalyst systems used in industry, in which the cis/trans ratios are moreover fixed.

It is known that the compounds used for tyre mixtures, in particular for the tread, consist of several rubbers in order to optimise the properties such as for example rolling resistance, wear and non-skid behaviour in the wet. These rubbers as a rule comprise natural rubber and synthetic rubbers such as polybutadiene, butadiene-styrene rubber or polyisoprene. A problem when using rubber mixtures is that incompatibilities may arise between the individual types of rubber. Such incompatibilities are reflected in increased tyre wear, low tear propagation resistance and short working life of the tyre.

It has now surprisingly been found that catalysts based on structurally defined allyl complexes of the rare earth metals are suitable for the copolymerisation of conjugated dienes with non-conjugated olefins, wherein compared to the hitherto known catalysts higher catalytic activities combined with a high variation range of the copolymerisation parameters and the selectivity of the diolefin can be achieved on the one hand, and the nature of the non-conjugated olefin can be widely varied on the other hand.

DETAILED DESCRIPTION OF THE INVENTION

The present invention accordingly provides a process for the copolymerisation of conjugated dienes with non-conjugated olefins, which is characterised in that the copolymerisation is carried out in the presence of catalysts consisting of:

(a) at least one allyl compound of the rare earth metals, or consisting of (a) at least one allyl compound of the rare earth metals and
(b) at least one activator at temperatures of −30 to +160° C. in aromatic, aliphatic or cycloaliphatic solvents, wherein the molar ratio of the catalyst components (a):(b) is in the range from 1:0.1 to 1000, the component (a) of the catalyst is employed in amounts of 1 μmole to 10 mmoles, referred to 100 g of the conjugated diolefins that are used, and the non-conjugated olefin is employed in amounts of 5 g to 1000 g, referred to 100 g of the conjugated diolefins that are used.

As conjugated diolefins (dienes) there may for example be used in the process according to the invention 1,3-butadiene, 1,3-isoprene, 2,3-dimethylbutadiene, 2,4-hexadiene, 1,3-pentadiene and/or 2-methyl-1,3-pentadiene.

As non-conjugated olefins there may for example be used in the process according to the invention styrene, α-methylstyrene dimer, p-methylstyrene, divinylbenzene, ethylene, propene, 1-butene, 1-pentene, 1-hexene, 1-octene, vinylcyclohexane and/or vinylcyclohexane.

The molar ratio of the components (a):(b) in the catalyst that is used is preferably in the range from 1:0.5 to 500, particularly preferably 1:1 to 100, and the component (a) is preferably used in amounts of 5 μmole to 1 mmole, referred to 100 g of the diolefins that are used.

The non-conjugated olefins are preferably used in amounts of 10 to 500 g, referred to 100 g of the conjugated diolefins.

As allyl compounds of the rare earth metals (component (a)), there may in particular be used compounds selected from tetra(allyl) complexes of the rare earth metals of the formula (I):

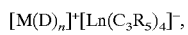

tris(allyl) complexes of the rare earth metals of the formula (II):

bis(allyl) complexes of the rare earth metals of the formula (III):

Ln(C$_3$R$_5$)$_2$(X)(D)$_n$ and mono(allyl) complexes of the rare earth metals of the formula (IV):

wherein

Ln denotes a trivalent element of the rare earth metals of atomic nos. 21, 39, 57 to 71,
X is identical or different and denotes an anion,
D is identical or different and denotes a neutral ligand,
M denotes an element of Group Ia of the periodic system of the elements (PSE) [F. A. Cotton, G. Wilkinson, Anorganische Chemie, 4$^{th}$ Edition, VCH Verlagsgesellschaft mbH, Weinheim, 1985],
R is identical or different and denotes hydrogen, a linear or branched, saturated or singly or multiply unsaturated C$_1$–C$_{30}$-alkyl radical or C$_5$–C$_{30}$-cycloalkyl radical which may optionally contain one or more heteroatoms such as N, P, O or S, a C$_6$–C$_{30}$-aryl radical optionally containing one or more heteroatoms and optionally singly or multiply substituted by alkyl, alkinyl or alkenyl radicals with 1 to 30 C atoms or phenyl groups with 6 to 30 C atoms, which aryl radical may be condensed with other aromatic compounds containing 6 to 30 carbon atoms, or denotes a silyl group substituted by alkyl, alkenyl or alkinyl groups with 1 to 30 C atoms or by phenyl groups with 6 to 30 C atoms, and
n denotes an arbitrary number from 0 to 10, preferably 0 to 5.

Compounds of the formula (II) to (IV) are preferably used in which

Ln denotes lanthanum, cerium, praseodymium and neodymium or a mixture of elements of the rare earth metal that contains at least one of the elements lanthanum, cerium, praseodymium or neodymium in an amount of at least 10 wt. %, preferably 30 wt. %, and particularly preferably denotes lanthanum, praseodymium or neodymium,
X denotes a halide such as F, Cl, Br or I, a cyclopentadienyl of the formula C$_5$H$_r$R$_{5-r}$ where r is equal to 0 to 5, for example C$_5$H$_5$, C$_5$Me$_5$, C$_5$Ph$_4$H, C$_5$Bz$_5$, C$_5$H$_4$-tert.-Bu, C$_5$H$_3$-tert.-Bu$_2$, C$_5$H$_4$Me, C$_5$H$_3$(SiMe$_3$)$_2$, an indenyl of the formula C$_9$H$_{7-s}$R$_5$ where s is equal to 0 to 7, for example C$_9$H$_7$, C$_9$H$_4$Me$_3$, a fluorenyl of the formula C$_{13}$H$_{9-t}$R$_t$, where t is equal to 0 to 9, an amide of the formula NR$_2$, for example NPh$_2$, N(C$_2$H$_4$NMe$_2$)$_2$, N(C$_2$H$_4$OMe)$_2$, N(SiMe$_3$)$_2$, N(SiHMe$_2$)$_2$, a pyrazolate of the formula N$_2$C$_3$R$_3$, for example N$_2$C$_3$H(3,5-Ph)$_2$, N$_2$C$_3$H(3-Me)(5-Ph), N$_2$C$_3$H(3,5-tert.-Bu)$_2$, a pyrazolyl borate of the formula RB(N$_2$C$_3$R$_3$)$_3$, for example HB(N$_2$C$_3$H$_3$)$_3$, HB(N$_2$C$_3$H(3,5-Me)$_2$)$_3$, a benzamidinate of the formula (RN)$_2$CR, for example (Me$_3$SiN)$_2$CPh, (Me$_3$SiN)$_2$CC$_6$H$_4$(4-Me), (Me$_3$SiN)$_2$CCH$_6$H$_4$(4-OMe), an alcoholate or phenolate of the formula OR, for example OC(tert.-Bu)$_3$, OC(tert.-Bu)$_2$Ph, OC$_6$H$_2$(2,6-tert.-Bu)$_2$(4-Me), a silanolate of the formula OSiR$_3$, for example OSi(tert.-Bu)$_3$, OSi(PH)$_3$, a thiolate of the formula SR, for example SC$_6$H$_3$(2,6-tert.-Bu)$_2$, a borate of the formula B(C$_6$R$^1_5$)$_4$ where R$^1$ denotes hydrogen, fluorine and/or trifluoromethyl, for example B(C$_6$H$_5$)$_4$, B(C$_6$F$_5$)$_4$, B(C$_6$H$_3$(CF)$_2$)$_4$, an aluminate of the formula Al(C$_6$R$^1_5$)$_4$ where R$^1$ denotes hydrogen, fluorine and/or trifluoromethyl, for example Al(C$_6$H$_5$)$_4$, Al(C$_6$F$_5$)$_4$, Al(C$_6$H$_3$(CF)$_2$)$_4$, a phenyl of the formula C$_6$H$_r$R$_{5-r}$, branched or unbranched primary, secondary or tertiary alkyl alkenyl or alkinyl radicals with 1 to 20 carbon atoms, for example CH$_3$, CMe$_3$, CH$_2$Ph, CH$_2$(C$_6$H$_4$(4-Me)), CH(SiMe$_3$)$_2$, CH$_2$(SiMe$_3$), CCSiMe$_3$, CCPh, wherein R has the meanings specified hereinbefore,
D denotes a neutral ligand with one, two or three identical or different donor atoms of Groups Vb or VIb of the periodic system of the elements, such as N, P, O or S, with unbranched, branched or cyclic, aliphatic or olefinic, primary, secondary or tertiary alkyl radicals with 1 to 20 carbon atoms or unsubstituted or substituted aromatic radicals with 6 to 20 carbon atoms, for example $CH_3OCH_3$, $C_2H_5OC_2H_5$, $(i\text{-}C_3H_7)O(i\text{-}C_3H_7)$, $CH_3O(i\text{-}C_3H_7)$, $(n\text{-}C_4H_9)O(n\text{-}C_4H_9)$, $CH_3O(C_2H_4)OCH_3$, $CH_3O(C_2H_4)O(C_2H_4)OCH_3$, $OC_4H_8$, $OC_4H_7Me$, $N(CH_3)_3$, $N(C_2H_5)_3$, $N(i\text{-}C_3H_7)_3$, $NPh(CH_3)_2$, $NPh_2(CH_3)$, $(CH_3)_2N(C_2H_4)N(CH_3)_2$, $(C_5H_{10})N(C_2H_4)N(C_5H_{10})$, $SC_4H_8$, $SC_4H_7Me$, a neutral hydrocarbon with olefinic or aromatic groups with 2 to 40 C atoms, such as 1,3-butadiene, isoprene, 2,4-hexadiene, 1,5-dimethylhexa-2,4-diene, $C_6H_6$, $C_6H_5Me$, $C_6H_3Me_3$, $C_6Me_6$, and M is lithium, sodium or potassium.

Examples of compounds of the formulae (I) to (IV) are π-allyl complexes of a trivalent element of the rare earth metals, such as e.g. the allyl compounds already described in WO 96/31544.

Particularly suitable are the following compounds of the formula (I):

$[K(C_4H_8O)_2][La(C_3H_5)_4]$ $[Li(C_4H_8O_2)_{1.5}][La(C_3H_5)_4]$ $[Li(C_4H_8O_2)_2][Nd(C_3H_5)_4]$

Particularly suitable are the following compounds of the formula (II):

$Nd(C_3H_5)_3(O_2C_4H_8)$ $La(C_3H_5)_3(O_2C_4H_8)_{1.5}$ $La(C_3H_5)_3(MeOC_2H_4OMe)$ $La(C_3H_5)_3(Me_2NC_2H_4NMe_2)$ $Nd(C_3H_5)_3$ $La(C_3H_5)_3$

Particularly suitable are the following compounds of the formula (III):

$Cp^*La(C_3H_5)_2$ $CpLa(C_3H_5)_2$ $Cp^*Nd(C_3H_5)_2$ $CpNd(C_3H_5)_2$ $La(C_3H_5)_2Cl(C_4H_8O)_2$ $Nd(C_3H_5)_2Cl(C_4H_8O)_2$ $La(C_3H_5)_2Br(C_4H_8O)_2$ $La(C_3H_5)_2I(C_4H_8O)_2$

Particularly suitable are the following compounds of the formula (IV):

$La(C_3H_5)Cl_2(C_4H_8O)_2$ $Nd(C_3H_5)Cl_2(C_4H_8O)_2$ $La(C_3H_5)Br_2(C_4H_8O)_3$ $Nd(C_3H_5)Br_2(C_4H_8O)_2$ wherein
$Cp^*=C_5Me_5$ and $Cp=C_5H_5$.

Suitable as activator (component (b)) are in particular the co-catalysts known from the field of metallocene chemistry, such as polymeric or oligomeric alumoxanes, aluminium organyl compounds, Lewis acids as well as fluorine-containing aluminium organyls, fluorine-containing boranes, fluorine-containing aluminates and fluorine-containing borates. In this connection reference may be made in particular to Macromol. Symp. Vol. 97, July 1995, pp. 1–246 (for alumoxanes) as well as to EP-A 277 003, EP-A 277 004, Organometallics 1997, 16, 842–857 (for fluorine-containing borates) and EP-A 573 403 (for fluorine-containing aluminates).

Preferred as component (b) are: alumoxanes and/or fluorine-containing boranes, fluorine-containing borates, fluorine-containing aluminium organyls and fluorine-containing aluminates.

As alumoxanes there are used aluminum-oxygen compounds which, as is known to the person skilled in the art, are obtained by contacting organoaluminum compounds with condensing components, such as for example water, and which denote non-cyclic or cyclic compounds of the formula $(-\!\!-Al(R)O-\!\!-)_m$, wherein R may be identical or different and denotes a linear or branched alkyl group with 1 to 10 carbon atoms that may also contain heteroatoms such as for example oxygen or nitrogen and wherein m denotes the number 2, 3 or 4, preferably 3. In particular R denotes methyl, ethyl, n-propyl, iso-propyl, n-butyl, iso-butyl, tert.-butyl, n-octyl or iso-octyl, particular preference being given to methyl, ethyl or iso-butyl. As examples of alumoxanes there may be mentioned: methyl alumoxane, ethyl alumoxane and iso-butyl alumoxane, methyl alumoxane and iso-butyl alumoxane being preferred.

As aluminium organyl compounds there are used compounds of the formula $AlR_{3-d}Y_d$, wherein R has the meaning described hereinbefore,
Y denotes hydrogen, an alcoholate, phenolate, amide or halide, and
d denotes a number from 0 to 2.

As aluminium organyl compounds of the formula $AlR_{3-d}X_d$ there may in particular be used: trimethylaluminium, triethylaluminium, tri-n-propylaluminium, tri-iso-propylaluminium, tri-n-butylaluminium, tri-iso-butylaluminium, tripentylaluminium, trihexylaluminium, tricyclohexylaluminium, trioctylaluminium, diethylaluminium hydride, di-n-butylaluminium hydride, di-iso-butylaluminium hydride, diethylaluminium butanolate, diethylaluminium methylidene(dimethyl)amine and diethylaluminium methylidene(methyl)ether, preferably trimethylaluminium, triethylaluminium, tri-iso-butylaluminium and di-iso-butylaluminium hydride.

As fluorine-containing boranes, fluorine-containing borates, fluorine-containing aluminium organyls or fluorine-containing aluminates, there are preferably used compounds of the trivalent elements boron or aluminium to which is bonded at least one phenyl group substituted by fluorine atoms or $CF_3$ groups. Particularly preferred are compounds with two or three of the aforedescribed fluorine-substituted phenyl groups. Examples of suitable compounds are:
$B(C_6F_5)_3$, $B\{C_6H_3(CF_3)_2\}_3$, $K[B(C_6F_5)_4]$, $K[B(C_6HF_4)_4]$, $K[B(C_6H_2F_3)_4]$, $K[B(C_6H_3F_2)_4]$, $K[B(CH_3)(C_6F_5)_3]$, $K[B(C_2H_5)(C_6F_5)_3]$, $K[B(C_3H_5)(C_6F_5)_3]$, $K[B(C_3H_7)(C_6F_5)_3]$, $K[B(C_6H_5)(C_6F_5)_3]$, $K[B\{C_6H_3(CF_3)_2\}_4]$, $K[B\{C_6H_2(CF_3)_3\}_4]$, $Al(C_6F_5)_3$, $Al\{C_6H_3(CF_3)_2\}_3$, $K[Al(C_6F_5)_4]$, $K[Al(C_6HF_4)_4]$, $K[Al(C_6H_2F_3)_4]$, $K[Al$ $(C_6H_3F_2)_4]$, $K[Al(CH_3)(C_6F_5)_3]$, $K[Al(C_2H_5)(C_6F_5)_3]$, $K[Al(C_3H_5(C_6F_5)_3]$, $K[Al(C_3H_7(C_6F_5)_3]$, $K[Al(C_6H_5(C_6F_5)_3]$, $K[Al\{C_6H_3(CF_3)_2\}_4]$, and/or $K[Al\{CH_6H_2(CF_3)_3\}_4]$, wherein K preferably denotes $[N(CH_3)_3H]$, $[N(C_2H_5)_3H]$, $[N(C_3H_7)_3H]$, $[\{C_6H_5N(CH_3)_2\}H]$ or $[C(C_6H_5)_3]$.

It is also possible to add a further component (c) to the catalyst components (a) and (b).

This component (c) may be an inert support material that serves for the heterogenisation of the catalyst components (a) and (b), i.e. for the application of the catalyst components (a) and (b) to the support material.

As support material there are used particulate inorganic solids or also particulate polymeric organic solids with a specific surface of greater than 10, preferably 10 to 1000 $m^2/g$ (BET) and with a pore volume of 0.3 to 15, preferably 0.5 to 12 ml/g, that behave inertly during the polymerisation reaction.

The specific surface (BET) is determined in the conventional manner [see for example S. Brunauer, P. H. Emmet and Teller, J. Amer. Chem. Soc. 60 (2) (1938) 309], and the pore volume is determined by the centrifugation method [M. McDaniel, J. Colloid Interface Sci. 78 (1980) 31].

Particularly suitable as inorganic solids are silica gels, clays, aluminosilicates, talcum, zeolites, carbon black, graphite, activated charcoal, inorganic oxides such as for example silicon dioxide, aluminium oxide, magnesium oxide and titanium dioxide, as well as silicon carbide; silica gels, zeolites and carbon black are preferred and silica gel is particularly preferred. Also suitable are organic support materials such as for example polyethylene, polypropylene, polystyrene or polybutadienes.

The aforementioned inorganic solids, which satisfy the aforementioned specification and are therefore suitable for use, are described in more detail for example in Ullmanns Enzyklopädie der technischen Chemie, Vol. 21, p. 439 ff. (silica gels), Vol. 23, p. 311 ff. (clays), Vol. 14, p. 633 ff. (carbon blacks), Vol. 24, p. 575 ff. and Vol. 17, p. 9 ff. (zeolites).

The inorganic and organic polymeric solids may be used individually or as a mixture with one another. 0.01 g to 10 g of the catalyst component (a), preferably 0.5 to 5 g of the catalyst component (a), are used per 100 g of the support material.

The production of a support-fixed catalyst depends on the support material that is used, the reactivity of the support material with respect to the catalyst components (a) and (b) being decisive.

If the support material is chemically inert with respect to the other compounds, i.e. no reaction takes place between the support material and the other compounds that are used, then the order of addition of the inert solvents and/or diluents, catalyst component (a) and catalyst component (b) may be varied as desired.

If the support material is not inert with respect to the other compounds, as is known for example in the case of support materials with surface OH groups with respect to organometallic compounds, then the activity of the resultant catalyst depends on the order of addition of the individual compounds.

In this case the support material may for example be made into a slurry in the inert solvent and/or diluent, following which the component (b) is first added and then the component (a), or a mixture of the components (a) and (b) is added.

As inert solvents and/or diluents there may be used aliphatic, cycloaliphatic and/or aromatic solvents such as pentane, hexane, heptane, cyclohexane, benzene and/or toluene, as well as halogenated hydrocarbons such as methylene chloride and chlorobenzene, individually or as a mixture.

The solvents that are used may be the same or different for all compounds or may be used as a mixture. The solvent and/or diluent used is separated by distillation after the desired time, optionally in vacuo, the supported catalyst being obtained as a free-flowing solid.

The amount of inert solvent and/or diluent that is used may vary within wide limits. For reasons of economy the amount is kept as low as possible. The minimum amount is governed by the amount and solubility of the individual compounds as well as by the pore volume of the support material. An amount of 10 to 2000 parts of the solvent and/or diluent referred to 100 parts of the support material, is preferably used.

The solvents may be used individually or as a mixture; the most favourable mixing ratio can easily be determined by suitable preliminary tests.

It is also possible to add a conjugated diolefin to the catalyst consisting of the catalyst components (a) and (b) or (a), (b) and (c), wherein this diolefin may be the same diolefin that is to be subsequently copolymerised using the catalyst. Butadiene and isoprene are preferably used.

The preparation of the catalyst may be carried out in a wide temperature range. In general the temperature is between the melting point and boiling point of the inert diluent and/or solvent. The preparation is normally carried out at temperatures from −20 to 160° C., preferably at temperatures from 0 to 140° C., particularly preferably at temperatures from 20 to 120° C.

It is obviously also possible to use the catalysts in the form of an arbitrary mixture with one another.

The copolymerisation takes place by bringing the aforedescribed catalyst into contact with the conjugated diolefins and the non-conjugated olefins.

For solution polymerisation the monomers are dissolved in a suitable solvent and/or diluent. It is also possible to carry out the copolymerisation without additional solvent and/or diluent. In this case one or more of the monomers that are used serves as solvent and/or diluent.

The catalyst may be used for the copolymerisation in homogenous form in a solvent and/or diluent, i.e. as a solution of the component (a) or of the components (a) and (b) in a solvent and/or a monomer that is present, or in heterogeneous form, i.e. as a supported catalyst consisting of the components (a), (b) and (c).

Conventional stabilisers such as for example sterically hindered phenols or aromatic amines may be added in normal amounts to the copolymer solutions. The isolation of the polymers is carried out in a known manner, such as for example by evaporation of the polymer solution, precipitation with a non-solvent such as for example methanol, ethanol and acetone, or steam distillation of the solvent. Drying is carried out by conventional methods, such as for example in a drying cabinet, vacuum drying cabinet or screw-conveyor drier.

For gas phase polymerisation there may be added to the gaseous monomer that is present further gases that serve either for dilution, removal of heat, or to regulate the molecular weight.

The catalyst is used preferably in heterogeneous form in gas phase polymerisation, i.e. as a supported catalyst consisting of the components (a), (b) and (c).

The copolymerisation may be carried out at pressures of 1 mbar to 50 bar, preferably 1 to 20 bar. In general the polymerisation is carried out at temperatures of −20 to 250° C., preferably at 0 to 200° C., particularly preferably at 20 to 160° C.

The process according to the invention may be carried out continuously or batchwise, and is preferably carried out continuously.

The following examples are intended to illustrate the aforedescribed invention.

EXAMPLES

All polymerisations were carried out under strict exclusion of air and moisture and under purified argon as protective gas. The toluene used as solvent was purified by boiling over sodium/benzophenone until the appearance of a violet colour, and was freshly distilled therefrom before use. The monomers butadiene and styrene were freed over sodium tetraethyl aluminate from traces of oxygen and moisture. Tributylaluminium was added to the 1-hexene in order to remove traces of oxygen and moisture. The hexene was distilled off from this solution immediately before use.

The composition as well as the microstructure of the polymers were determined by IR spectroscopy after steeping the polymer samples in $CS_2$. The content of hexene units in the polymer was determined by $^1H$-NMR spectroscopy after dissolving a sample in $DCCl_3$.

The yields and compositions of the polymers obtained are summarised in Table 1.

Example 1

25.6 mg of tri(allyl)neodymium $Nd(C_3H_5)_3$, in molten form in a thin-walled small glass flask, 62 ml of toluene, 10 g of styrene and 7.8 g of butadiene were added in succession to a temperature-controlled double-jacketed vessel. The mixture was maintained at a temperature of 50° C. and the reaction was initiated by breaking the thin-walled glass flask. The tri(allyl)neodymium dissolves immediately to form a yellow solution which foams vigorously after shaking for 5 minutes and then becomes significantly more viscous during the course of the reaction. After a reaction time of 45 minutes the polymerisation was terminated by pouring the reaction mixture into 400 ml of methanol to which ca. 100 mg of ionol had previously been added as stabiliser. The resultant polymer then separated as a white sticky mass, was isolated by decanting the solvent, and was dried in a vacuum drying cabinet for 24 hours at 50° C.

Example 2

34.6 mg of pentamethylcyclopentadienyldi(allyl) neodymium $Cp^*Nd(C_3H_5)_2$, in molten form in a, thin-walled small glass flask, 62 ml of toluene, 58 mg of $Al(C_6F_5)_3(OEt_2)$, 19.9 g of styrene and 7.8 g of butadiene were added in succession to a temperature-controlled double-jacketed vessel. The mixture was maintained at 50° C. and the reaction was initiated by breaking the glass flask. The $Cp^*Nd(C_3H_5)_2$ dissolves immediately to form a yellow solution which foams after shaking for 15 minutes and that becomes significantly more viscous during the course of the reaction. After a reaction time of 2 hours the polymerisation was terminated by pouring the reaction mixture into 400 ml of methanol to which ca. 100 mg of ionol had previously been added as stabiliser. The resultant polymer separated as a white sticky mass, was isolated by decanting the solvent, and was dried in a vacuum drying cabinet for 24 hours at 50° C.

Example 3

40 ml of styrene, 9.3 g of butadiene and 19.1 mg of pentamethylcyclopentadienyldi(allyl)neodymium $Cp^*Nd$ $(C_3H_5)_2$ dissolved in 0.96 ml of a 1.66 molar solution of methyl alumoxane in toluene were added in succession to a temperature-controlled double-jacketed vessel. The polymerisation took place at 23° C. After a reaction time of 2.2 hours the polymerisation was terminated by pouring the reaction mixture into 200 ml of methanol to which ca. 50 mg of ionol had previously been added as stabiliser. The resultant polymer was isolated by decanting the solvent, and was dried in a vacuum drying cabinet for 24 hours at 50° C.

Example 4

65.6 mg of $[C_3H_5NdC_6F_5(dioxane)_4][C_3H_5B(C_6F_5)_3]$ in molten form in a thin-walled small glass flask, 67.5 ml of toluene, 21.7 g of styrene and 8.5 g of butadiene were added in succession to a temperature-controlled double-jacketed vessel. The mixture was maintained at 50° C. and the reaction was initiated by breaking the glass flask. $[C_3H_5NdC_6F_5(dioxane)_4][C_3H_5B(C_6F_5)_3]$ dissolves immediately to form a yellow solution which foams after shaking for 2 minutes and that becomes significantly more viscous during the course of the reaction. After a reaction time of 20 minutes the polymerisation was terminated by pouring the reaction mixture into 400 ml of methanol to which ca. 100 mg of ionol had previously been added as stabiliser. The resultant polymer separated as a white sticky mass, was isolated by decanting the solvent, and was dried in a vacuum drying cabinet for 24 hours at 50° C.

Preparation of the Supported Catalyst for Examples 5–6

100 g of a silica gel dehydrated at 200° C. in a vacuum (0.5 Pa) and having a BET surface of 300 $m^2/g$ was made into a slurry in 500 ml of toluene and stirred with 800 g of a 10% solution of methyl aluminoxane (MAO) in toluene for 2 hours at −40° C. and 48 hours at room temperature. The solid matter was then filtered off, washed several times with toluene, and dried at room temperature in vacuo.

80 g of the silica get pretreated in the above manner with MAO were suspended in 400 ml of toluene and a catalyst solution prepared at −50° C. from 3.2 g of $Nd(C_3H_5)_3^*$dioxane and 100 ml of 10% MAO solution in toluene was added at −50° C. The reaction mixture was stirred for 5 hours at −30 to −50° C., and the solid material was filtered off after heating to room temperature, washed with toluene, and dried in vacuo at room temperature.

The supported catalyst prepared in the above manner contained 12.6% Al and 1.56% Nd.

Example 5

0.298 g of supported catalyst was weighed out and added to the reaction chamber of a twin-chamber vessel, and 30 ml of a solution of 6.84 g of butadiene in 59.5 g of styrene (1.665 mole of butadiene/l) were added to the other chamber. The monomer solution was mixed with the catalyst by rotating the apparatus and the catalyst was then suspended by rapid stirring. The reaction mixture was stirred at 25° C. The viscosity of the mixture increased substantially during the course of the reaction.

After 2 hours the polymerisation was terminated by injecting 5 ml of methanol and the mixture was then poured into 300 ml of methanol (together with ca. 0.1 g of ionol), whereupon the polymer containing the decomposed catalyst precipitated as a white, sticky mass. The product was isolated by decanting and, after washing with methanol, was dried for 24 hours in a vacuum drying cabinet at 60° C.

Example 6

0.209 g of supported catalyst was weighed out and added to the reaction chamber of a twin-chamber vessel and suspended in 40 ml of 1-hexene. 40 ml of a solution of 15.0 g of butadiene in 76.4 g of 1-hexene (corresponding to 2.032 mole of butadiene/l) were added to the other chamber. The monomer solution was added to the catalyst by rotating the apparatus and the solutions were mixed by rapid stirring. During the reaction there was a noticeable rise in temperature from 25° C. to 35° C. and a rapid increase in the viscosity.

After 10 minutes the polymerisation was terminated by injecting 5 ml of methanol and the mixture was then poured into 300 ml of methanol (together with ca. 0.1 g of ionol), whereupon the polymer containing the decomposed catalyst precipitated as a white, sticky mass. The product was isolated by decanting and, after washing with methanol, was dried for 24 hours in a vacuum drying cabinet at 60° C.

TABLE 1

Yields and compositions of the polymers obtained

| Example | Polymer Yield g | Comonomer | Buta- diene wt. % | | Selectivity butadiene fraction (% referred to 100%) | |
|---|---|---|---|---|---|---|
| | | | wt. % | 1,4-cis | 1,4-trans | 1,2 |
| 1 | 4.5 | styrene | 13.5 | 86.5 | 9.2 | 85.0 | 5.8 |
| 2 | 3.4 | styrene | 4.0 | 96.0 | 76.5 | 19.3 | 4.2 |
| 3 | 4.2 | styrene | 9.6 | 90.4 | 61 | 28 | 11 |
| 4 | 3.9 | styrene | 6.5 | 93.5 | 78.1 | 18.7 | 3.2 |
| 5 | 0.6 | styrene | 13 | 87.0 | 88.5 | 8.0 | 3.4 |
| 6 | 1.4 | 1-hexene | 25 | 75.0 | 97.3 | 1.3 | 1.3 |

What is claimed is:

1. A process for the copolymerization of conjugated diolefins with non-conjugated olefins comprising the step of polymerizing said conjugated diolefins and non-conjugated olefins in the presence of catalysts comprising at least one allyl compound of the rare earth metals, in the presence of aliphatic and/or aromatic solvents at temperatures of −30 to +160° C., wherein the catalyst is employed in amounts of 1 μmole to 10 mmoles based upon 100 g of the conjugated diolefins, and the non-conjugated olefin is employed in amounts of 5 g to 2000 g based upon 100 g of the conjugated diolefins.

2. A process according to claim 1, wherein said conjugated diolefins is selected from the group consisting of 1,3-butadiene, 1,3-isoprene, 2,3-dimethyl-utadiene, 2,4-hexadiene, 1,3-pentadiene and 2-methyl-1,3-pentadiene.

3. A process according to claim 1, wherein said non-conjugated olefins are selected from the group consisting of styrene, α-methylstyrene dimer, p-methylstyrene, divinylbenzene, ethylene, propene, 1-butene, 1-pentene, 1-hexene, 1-octene, vinylcyclohexene and vinylcyclohexane.

4. A process according to claim 1, wherein said allyl compounds of the rare earth metals are tetra(allyl) complexes of the rare earth metals of the formula (I):

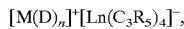

tris(allyl) complexes of the rare earth metals of the formula (II):

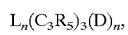

bis(allyl) complexes of the rare earth metals of the formula (III):

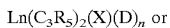

mono(allyl) complexes of the rare earth metals of the formula (IV):

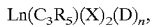

wherein
Ln denotes a trivalent element of the rare earth metals of atomic numbers 21, 39, 57 to 71,
X is identical or different and denotes an anion,
D is identical or different and denotes a neutral ligand,
M denotes an element of Group Ia of the periodic system of the elements,
R is identical or different and denotes hydrogen, a linear or branched, saturated or singly or multiply unsaturated $C_1$–$C_{30}$-alkyl radical or $C_5$–$C_{30}$-cycloalkyl radical which may optionally contain one or more heteroatoms, a $C_6$–$C_{30}$-aryl radical optionally containing one or more heteroatoms and optionally singly or multiply substituted by alkyl, alkinyl or alkenyl radicals with 1 to 30 C atoms or phenyl groups with 6 to 30 C atoms, which aryl radical may be condensed with other aromatic compounds containing 6 to 30 carbon atoms, or denotes a silyl group substituted by alkyl, alkenyl or alkinyl groups with 1 to 30 C atoms or by phenyl groups with 6 to 30 C atoms, and
n denotes an arbitrary number from 0 to 10.

5. A process according to claim 1, wherein an inert, particulate, inorganic or organic solid having a specific surface greater than 10 m²/g (BET) and a pore volume of 0.3 to 15 ml/g is added to the catalyst, said catalyst being used in amounts of 0.01 g to 10 g based upon 100 g of support material.

6. A process for the copolymerization of conjugated diolefins with non-conjugated olefins comprising the step of polymerizing conjugated diolefins and non-conjugated olefins in the presence of catalysts comprising (a) at least one allyl compound of the rare earth metals and
(b) at least one activator in the presence of aliphatic and/or aromatic solvents at temperatures of −30 to +160° C., wherein the molar ratio of the catalyst components (a):(b) is in the range from 1:0.1 to 1000, wherein component (a) of the catalyst is present in amounts of 1 μmole to 10 mmoles based upon 100 g of the conjugated diolefins, and the non-conjugated olefin is employed in amounts of 5 g to 2000 g, referred to 100 g of the conjugated diolefins that are used.

7. A process according to claim 6, wherein said conjugated diolefins is selected from the group consisting of 1,3-butadiene, 1,3-isoprene, 2,3-dimethylbutadiene, 2,4-hexadiene, 1,3-pentadiene and 2-methyl-1,3-pentadiene.

8. A process according to claim 6, wherein said non-conjugated olefins are selected from the group consisting of styrene, α-methylstyrene dimer, p-methylstyrene, divinylbenzene, ethylene, propene, 1-butene, 1-pentene, 1-hexene, 1-octene, vinylcyclohexene and vinylcyclohexane.

9. A process according to claim 6, wherein said allyl compound of the rare earth metals are tetra(allyl) complexes of the rare earth metals of the formula (I):

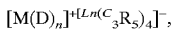

tris(allyl) complexes of the rare earth metals of the formula (II):

$$L_n(C_3R_5)_3(D)_n,$$

bis(allyl) complexes of the rare earth metals of the formula (III):

$$Ln(C_3R_5)_2(X)(D)_n \text{ or}$$

mono(allyl) complexes of the rare earth metals of the formula (IV):

$$Ln(C_3R_5)(X)_2(D)_n,$$

wherein

Ln denotes a trivalent element of the rare earth metals of atomic numbers 21, 39, 57 to 71, X is identical or different and denotes an anion, D is identical or different and denotes a neutral ligand, M denotes an element of Group Ia of the periodic system of the elements, R is identical or different and denotes hydrogen, a linear or branched, saturated or singly or multiply unsaturated $C_1$–$C_{30}$-alkyl radical or $C_5$–$C_{30}$-cycloalkyl radical which may optionally contain one or more heteroatoms, a $C_6$–$C_{30}$-aryl radical optionally containing one or more heteroatoms and optionally singly or multiply substituted by alkyl, alkinyl or alkenyl radicals with 1 to 30 C atoms or phenyl groups with 6 to 30 C atoms, which aryl radical may be condensed with other aromatic compounds containing 6 to 30 carbon atoms, or denotes a silyl group substituted by alkyl, alkenyl or alkinyl groups with 1 to 30 C atoms or by phenyl groups with 6 to 30 C atoms, and n denotes an arbitrary number from 0 to 10.

10. A process according to claim 6, wherein said activators are polymeric or oligomeric alumoxanes, aluminum organyl compounds, Lewis acids, fluorine-containing aluminum organyls, fluorine-containing boranes, fluorine-containing aluminates or fluorine-containing borates.

11. A process according to claim 6, wherein the activators are alumoxanes and/or fluorine-containing aluminum organyls, fluorine-containing boranes, fluorine-containing aluminates and/or fluorine-containing borates.

12. A process according to claim 6, wherein an inert, particulate, inorganic or organic solid having a specific surface greater than 10 m²/g (BET) and a pore volume of 0.3 to 15 ml/g is added to the catalyst, said catalyst being used in amounts of 0.01 g to 10 g based upon 100 g of support material.

* * * * *